(12) United States Patent
Wu

(10) Patent No.: US 9,599,242 B2
(45) Date of Patent: Mar. 21, 2017

(54) ANTI-SIPHON ONE-WAY VALVE

(71) Applicant: PURITY (XIAMEN) SANITARY WARE CO., LTD., Xiamen (CN)

(72) Inventor: Chin-Lung Wu, Xiamen (CN)

(73) Assignee: PURITY (XIAMEN) SANITARY WARE CO., LTD., Xiamen, Fujian (CN)

( * ) Notice: Subject to any disclaimer, the term of this patent is extended or adjusted under 35 U.S.C. 154(b) by 0 days.

(21) Appl. No.: 14/630,653

(22) Filed: Feb. 25, 2015

(65) Prior Publication Data
US 2016/0245414 A1 Aug. 25, 2016

(51) Int. Cl.
*F16K 15/06* (2006.01)
*F16K 15/02* (2006.01)

(52) U.S. Cl.
CPC .......... *F16K 15/063* (2013.01); *F16K 15/025* (2013.01)

(58) Field of Classification Search
CPC ...... F16K 15/025; F16K 15/063; F16K 1/427; F15K 15/026
USPC .......................... 137/542, 543, 454.2, 516.29
See application file for complete search history.

(56) References Cited

U.S. PATENT DOCUMENTS

| | | | | |
|---|---|---|---|---|
| 3,540,472 A | * | 11/1970 | Brady | F16K 15/06 137/516.29 |
| 4,271,862 A | * | 6/1981 | Snoek | F16K 1/34 137/511 |
| 4,862,913 A | * | 9/1989 | Wildfang | F16K 15/063 137/516.29 |
| 6,340,031 B1 | * | 1/2002 | Matsumoto | B60K 15/04 137/513.3 |

* cited by examiner

*Primary Examiner* — Craig Schneider
*Assistant Examiner* — P. Macade Nichols
(74) *Attorney, Agent, or Firm* — Leong C. Lei

(57) ABSTRACT

An anti-siphon one-way valve includes a valve seat, a valve core, a return spring, and a Y-shaped ring. The valve seat has an inlet and an outlet. The valve seat has a valve cavity therein. The valve cavity communicates with the inlet and the outlet respectively. The valve core is slidably mounted in the valve cavity. The Y-shaped ring is installed on the valve core and leans against the side wall of the valve cavity. The Y-shaped ring has a Y-shaped cross-section. The return spring is fitted on the valve core. The present invention provides a better anti-siphon effect, and the requirements for precision in size and installation are lower, and the production cost is reduced.

7 Claims, 4 Drawing Sheets

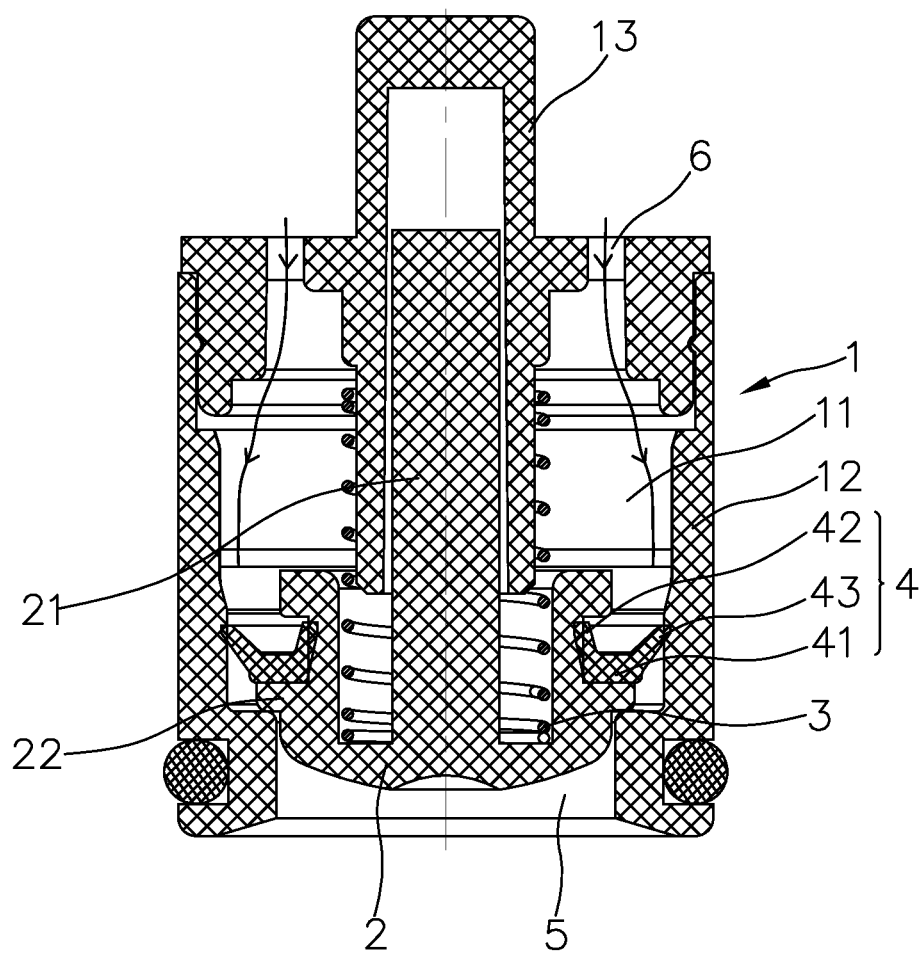
F I G. 4

ANTI-SIPHON ONE-WAY VALVE

TECHNICAL FIELD OF THE INVENTION

The present invention relates to a liquid valve, and more particularly to an anti-siphon one-way valve.

DESCRIPTION OF THE PRIOR ART

As shown in FIG. 1, a conventional anti-siphon one-way valve comprises a valve seat 10, a block seat 20, a valve core 30, a return spring 40, and an O-shaped seal ring 50. The valve seat 10 is formed with an accommodation cavity 101 therein. The block seat 20 is installed at one end of the valve seat 10 to block one end of the accommodation cavity 101. The block seat 20 is provided with an outlet communicating with the accommodation cavity 101. The other end of the valve seat 10 is provided with an inlet communicating with the accommodation cavity 101. The inlet is connected with the other end of the accommodation cavity 101 to form a connecting transition section 102. The diameter of the connecting transition section 102 is gradually reduced along the inlet to form a slope. The valve core 30 is placed in the accommodation cavity 101 of the valve seat 10 and slidable in the accommodation cavity 101. The inlet can prevent the valve core 30 from dropping. The return spring 40 is fitted on the valve core 30. The O-shaped ring 50 is installed on the valve core 30 to cooperate with the connecting transition section 102.

The block seat 20 is formed with an insertion hole 201 therein. The valve core 30 comprises a valve rod 301 and a valve body 302. The valve body 302 is integrally formed with one end of the valve rod 301. Another end of the valve rod 301 is inserted into the insertion hole 201 of the block seat 20 and slidable in the insertion hole 201. The return spring 40 is fitted on the valve rod 301. One end of the return spring 40 is against the valve body 302, and another end of the return ring 40 is against the block seat 20. The O-shaped ring 50 is installed on the valve rod 302. Specifically, the valve body 302 is formed with an installation groove. The O-shaped ring 50 is installed in the installation groove.

In an initial state, not use, the O-shaped ring 50 biased by the return spring 40 is pressed against the connecting transition section 102.

When a liquid enters the accommodation cavity 101 through the inlet, under action of liquid pressure, the valve body 302 is pressed to compress the return spring 40. The O-shaped ring 50 is moved away from the connecting transition section 102 to form a gap relative to the inner side wall of the valve seat 10 for the liquid to flow through the gap.

When the liquid enters the accommodation cavity 101 of the valve seat 10 through the outlet reversely, the valve body 302 is pushed by the return spring 40 and the O-shaped ring 50 is pressed against the connecting transition section 102 to block the liquid from backflow, providing an anti-siphon function.

The conventional anti-siphon one-way valve has some shortcomings The O-shaped ring may be eccentric to result in that the sealing effect is not good. The requirement for the material of the seal ring is strict, and high precision of installation is also required. It is easy to cause a bad seal. The coaxial requirement for the valve core, the valve rod, and the block seat is also strict, which also results in a bad seal. The requirement for precision in size for the valve body provided with the O-shaped ring is strict, or it is easy to cause a bad seal.

Accordingly, the inventor of the present invention has devoted himself based on his many years of practical experiences to solve these problems.

SUMMARY OF THE INVENTION

The primary object of the present invention is to provide an anti-siphon one-way valve which provides a better anti-siphon effect. The requirements for precision in size and installation are lower, and the production cost is reduced.

In order to achieve the aforesaid object, the anti-siphon one-way valve of the present invention comprises a valve seat, a valve core, a return spring, and a Y-shaped ring. The valve seat has an inlet and an outlet. The valve seat has a valve cavity therein. The valve cavity communicates with the inlet and the outlet respectively. The valve core is slidably mounted in the valve cavity. The Y-shaped ring is installed on the valve core and leans against the side wall of the valve cavity. The Y-shaped ring has a Y-shaped cross-section. The return spring is fitted on the valve core.

Preferably, the Y-shaped ring comprises an installation base, an installation side wing and an elastic side wing respectively formed at two sides of the installation base. The elastic side wing is against the side wall of the valve cavity. With the inlet of the valve cavity as a reference direction, the elastic side wing and the side wall of the valve cavity form an included angle which is an acute angle.

Preferably, a first diameter of the valve cavity, close to the inlet, is smaller than a second diameter of the valve cavity, close to the outlet.

Preferably, the inlet has a diameter smaller than the first diameter of the valve cavity, close to the inlet. The diameter of the inlet is smaller than a width of the valve core to prevent the valve core from dropping.

Preferably, the valve seat comprises an anti-siphon seat and an anti-siphon block seat. The anti-siphon block seat is installed at one end of the anti-siphon seat. The anti-siphon block seat is provided with the outlet. Another end of the anti-siphon seat is provided with the inlet.

Preferably, the anti-siphon block seat is provided with an insertion hole. The valve core comprises a valve rod and a valve body. The valve body is integrally formed with one end of the valve rod. Another end of the valve rod is inserted into the insertion hole of the anti-siphon block seat and slidable in the insertion hole.

Preferably, the insertion hole has a depth equal to a length of the valve rod.

Preferably, the return spring is fitted on the valve rod. One end of the return spring is against the valve body, and another end of the return ring is against the anti-siphon block seat.

Accordingly, the valve core of the present invention is slidably mounted in the valve cavity. The Y-shaped ring is installed on the valve core and leans against the valve cavity. The Y-shaped ring has a Y-shaped cross-section. The return spring is fitted on the valve core.

When a liquid enters the valve cavity through the inlet, under action of liquid pressure, the valve core is pressed to compress the return spring. The liquid flows through the gap formed between the Y-shaped ring and the inner side wall of the valve seat. When the liquid enters the valve cavity through the outlet reversely, the valve core is pushed by the return spring to restore. Under action of liquid pressure, the Y-shaped ring is against the side wall of the valve cavity more tightly to block the liquid from backflow, achieving an anti-siphon function.

The Y-shaped cross-section of the Y-shaped ring enables the requirements for precision in size and installation to be lower, such that the production cost is reduced and the anti-siphon effect is better.

BRIEF DESCRIPTION OF THE DRAWINGS

FIG. 4 is a sectional view of the present invention, showing the liquid in a backflow state.

DETAILED DESCRIPTION OF THE PREFERRED EMBODIMENTS

Embodiments of the present invention will now be described, by way of example only, with reference to the accompanying drawings.

Figure 2:
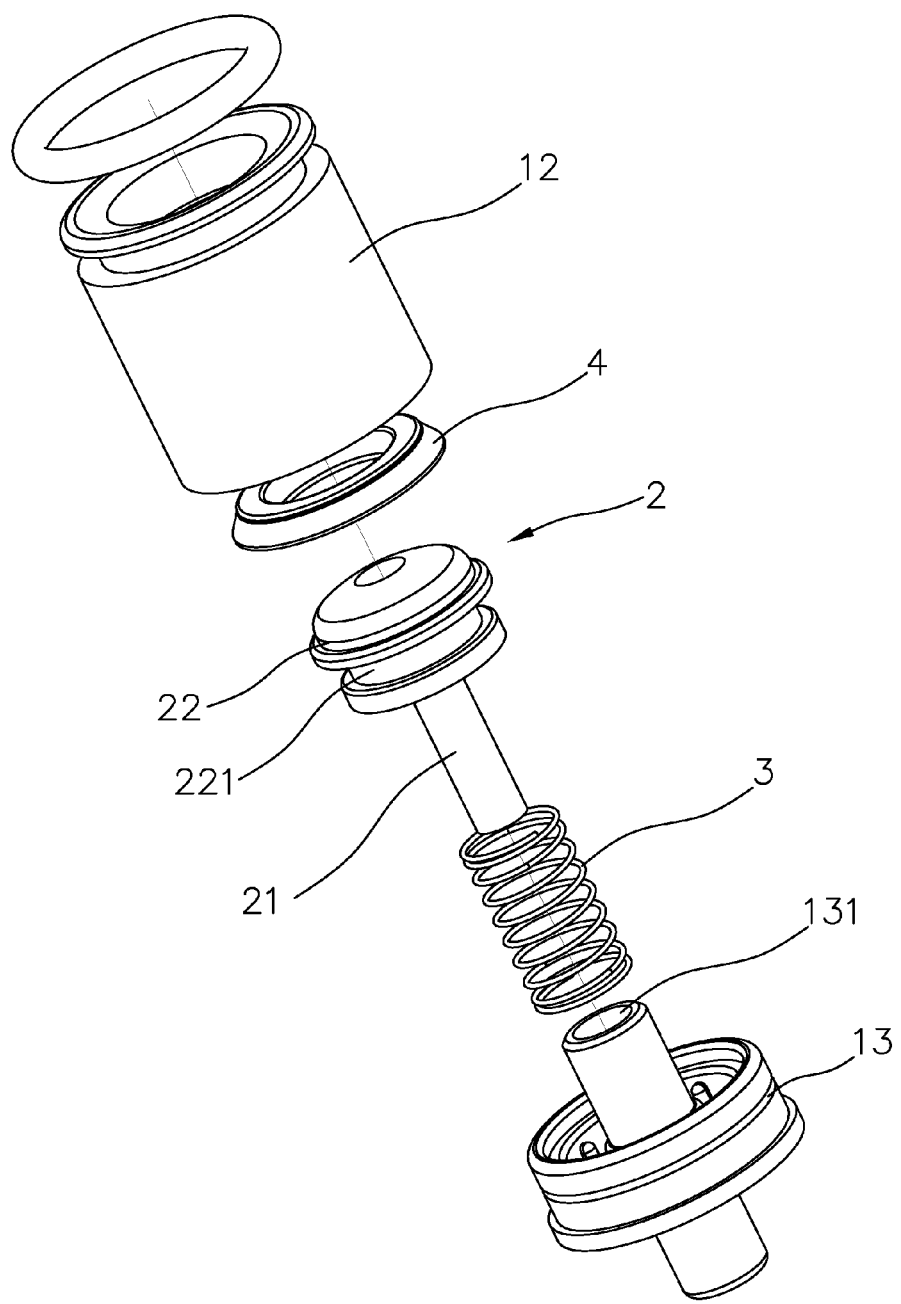
FIG. 2 is an exploded view of the present invention.
Figure 3:
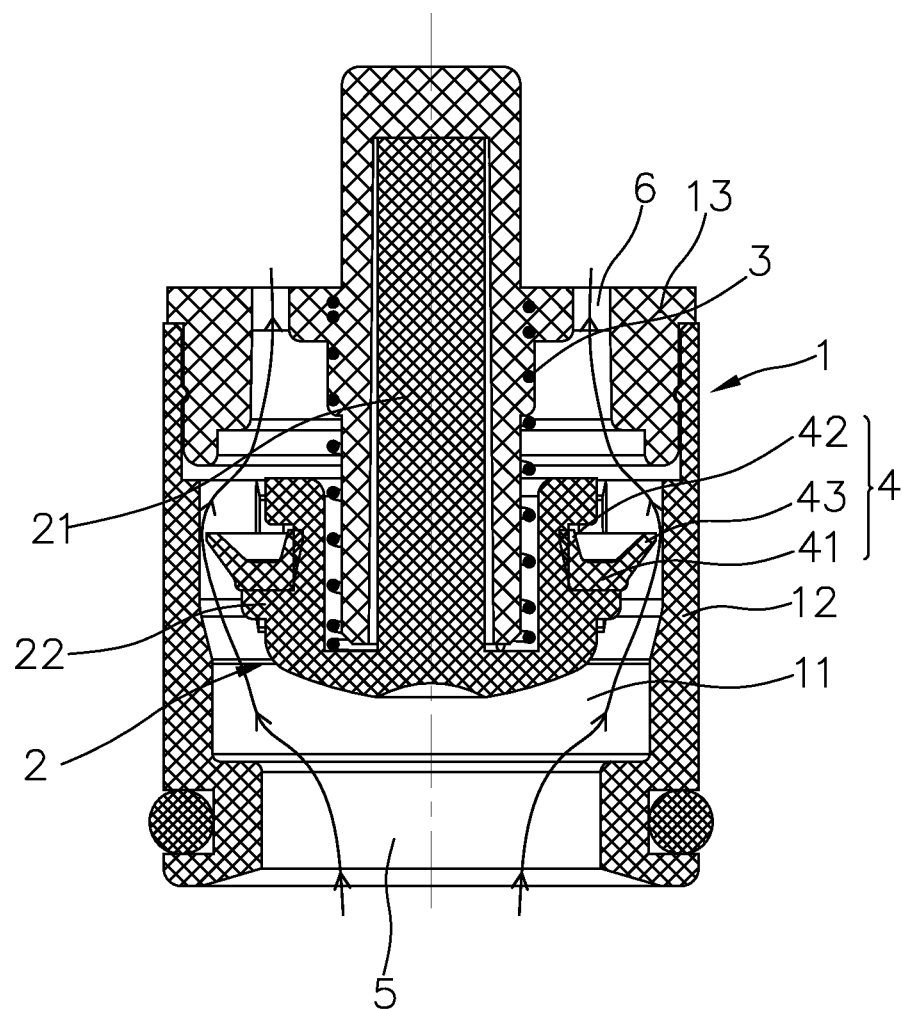
FIG. 3 is a sectional view of the present invention, showing the liquid in a downstream state.

Referring to FIG. 2 through FIG. 4, the present invention discloses an anti-siphon one-way valve. The anti-siphon one-way valve comprises a valve seat 1, a valve core 2, a return spring 3, and a Y-shaped ring 4.

The valve seat 1 has an inlet 5 and an outlet 6. The valve seat 1 has a valve cavity 11 therein. The valve cavity 11 communicates with the inlet 5 and the outlet 6 respectively. This is a universal structure of the one-way valve.

The valve core 2 is slidably mounted in the valve cavity 11. The Y-shaped ring 4 is installed on the valve core 2 and leans against the side wall of the valve cavity 11. The Y-shaped ring 4 has a Y-shaped cross-section. The return spring 3 is fitted on the valve core 2. The Y-shaped cross-section of the Y-shaped ring 4 indicates that after the one-way valve is installed, the inlet 5 is located under the outlet 6 to be a Y shape, as shown in FIG. 3 and FIG. 4.

The Y-shaped cross-section of the Y-shaped ring 4 enables the requirements for precision in size and installation to be lower, so the production cost is reduced and the anti-siphon effect is better.

The valve seat 1 comprises an anti-siphon seat 12 and an anti-siphon block seat 13. The anti-siphon block seat 13 is installed at one end of the anti-siphon seat 12. The anti-siphon block seat 13 is provided with the outlet 16. Another end of the anti-siphon seat 12 is provided with the inlet 15.

Figure 1:
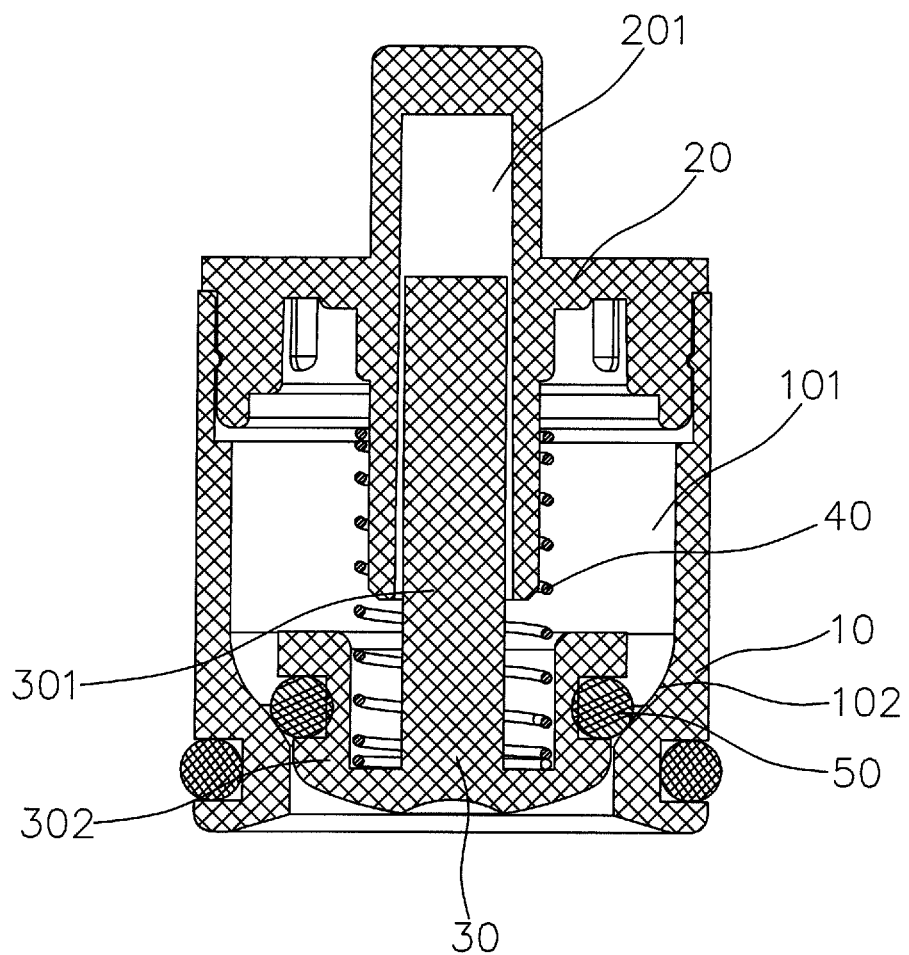
FIG. 1 is a sectional view of a conventional one-way valve.

The anti-siphon block seat 13 is provided with an insertion hole 131. As shown in FIG. 1, the valve core 2 comprises a valve rod 21 and a valve body 22. The valve body 22 is integrally formed with one end of the valve rod 21. Another end of the valve rod 21 is inserted into the insertion hole 131 of the anti-siphon block seat 13, and slidable in the insertion hole 131. The depth of the insertion hole 131 is equal to the length of the valve rod 21, enabling the structure to be more compact.

The return spring 3 is fitted on the valve rod 21. One end of the return spring 3 is against the valve body 22, and another end of the return ring 3 is against the anti-siphon block seat 13.

In this embodiment, the Y-shaped ring 4 comprises an installation base 41, an installation side wing 42 and an elastic side wing 43 respectively formed at two sides of the installation base 41. The elastic side wing 43 is against the side wall of the valve cavity 11. With the inlet 5 of the valve cavity 11 as a reference direction, the elastic side wing 43 and the side wall of the valve cavity 11 form an included angle which is an acute angle.

The Y-shaped ring 4 is installed on the valve body 22. Specifically, the valve body 22 is formed with an installation groove 221. The Y-shaped ring 4 is installed in the installation groove 221. One side wall of the installation groove 221 is longer than the other side wall of the installation groove 221. The installation base 41 is installed on the longer side wall of the installation groove 221, enabling the Y-shaped ring 4 to be installed steadily.

When a liquid enters the valve cavity 11 through the inlet 5, under action of liquid pressure, the valve core 2 is pressed to compress the return spring 3. The liquid flows through the gap formed between the elastic side wing 43 of the Y-shaped ring 4 and the inner side wall of the anti-siphon seat 12 of the valve seat 1.

When the liquid enters the valve cavity 11 through the outlet 6 reversely, the valve core 2 is pushed by the return spring 3 to restore. Under action of liquid pressure, the elastic side wing 43 of the Y-shaped ring 4 is against the side wall of the valve cavity 11 more tightly to block the liquid from backflow.

A first diameter of the valve cavity 11, close to the inlet 5, is smaller than a second diameter of the valve cavity 11, close to the outlet 6, such that when liquid enters the valve cavity 11 through the inlet 5, under action of liquid pressure, the valve core 2 is pressed to compress the return spring 3 in the direction of the outlet 6. The gap between the Y-shaped ring 4 and the inner side wall of the anti-siphon seat 12 of the valve seat 1 becomes bigger, so that the liquid can flow through the gap smoothly. When the liquid enters the valve cavity 11 through the outlet 6 reversely, the valve core 2 is pushed by the return spring 3 in the direction of the inlet 5. The gap between the Y-shaped ring 4 and the inner side wall of the anti-siphon seat 12 of the valve seat 1 becomes smaller. Under action of liquid pressure, the Y-shaped ring 4 is against the side wall of the valve cavity 11 more tightly to block the liquid from backflow. The anti-siphon effect is better.

The diameter of the inlet 5 is smaller than the first diameter of the valve cavity 11, close to the inlet 5. The diameter of the inlet 5 is smaller than the width of the valve core 2 to prevent the valve core 2 from dropping.

Although particular embodiments of the present invention have been described in detail for purposes of illustration, various modifications and enhancements may be made without departing from the spirit and scope of the present invention. Accordingly, the present invention is not to be limited except as by the appended claims.

I claim:

1. An anti-siphon one-way valve, comprising a valve seat, a valve core, a return spring, and a Y-shaped ring; the valve seat having an inlet and an outlet, the valve seat having a valve cavity therein, the valve cavity communicating with the inlet and the outlet respectively; the valve core being slidably mounted in the valve cavity, the Y-shaped ring being installed on the valve core and leaning against a side wall of the valve cavity, the Y-shaped ring having a Y-shaped cross-section, the return spring being fitted on the valve core;

wherein the Y-shaped ring comprises an installation base, an installation side wing and an elastic side wing respectively formed at two sides of the installation base, the elastic side wing is against the side wall of the valve cavity, with the inlet of the valve cavity as a reference direction, the elastic side wing and the side wall of the valve cavity form an included angle which is an acute angle; and wherein the valve core comprises a valve rod and a valve body, the valve body comprises a circumferential installation groove formed on an outer circumferential surface of the valve body to receive the Y-shaped ring mounted therein, wherein the installation groove has first and second side walls that are opposite to each other to define a space and the first side wall is longer than the second side wall such that the Y-shaped ring is received in the space between the first and second side walls with the installation base seated on the first side wall and the elastic side wing projecting outside the space for engagement with the side wall of the valve cavity.

2. The anti-siphon one-way valve as claimed in claim 1, wherein a first diameter of the valve cavity, close to the inlet, is smaller than a second diameter of the valve cavity, close to the outlet.

3. The anti-siphon one-way valve as claimed in claim 1, wherein the inlet has a diameter smaller than the first diameter of the valve cavity, close to the inlet, and the diameter of the inlet is smaller than a width of the valve core to prevent the valve core from dropping.

4. The anti-siphon one-way valve as claimed in claim 1, wherein the valve seat comprises an anti-siphon seat and an anti-siphon block seat, the anti-siphon block seat is installed at one end of the anti-siphon seat, the anti-siphon block seat is provided with the outlet, and another end of the anti-siphon seat is provided with the inlet.

5. The anti-siphon one-way valve as claimed in claim 4, wherein the anti-siphon block seat is provided with an insertion hole, the valve body is integrally formed with one end of the valve rod, and another end of the valve rod is inserted into the insertion hole of the anti-siphon block seat and slidable in the insertion hole.

6. The anti-siphon one-way valve as claimed in claim 5, wherein the insertion hole has a depth equal to a length of the valve rod.

7. The anti-siphon one-way valve as claimed in claim 5, wherein the return spring is fitted on the valve rod, one end of the return spring is against the valve body, and another end of the return ring is against the anti-siphon block seat.

* * * * *